US008370011B2

(12) United States Patent
Nakagawa

(10) Patent No.: US 8,370,011 B2
(45) Date of Patent: Feb. 5, 2013

(54) OPERATION CONTROLLER AND METHOD OF CONTROLLING OPERATIONS

(75) Inventor: Nobuyuki Nakagawa, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 141 days.

(21) Appl. No.: 12/452,394

(22) PCT Filed: Mar. 23, 2009

(86) PCT No.: PCT/IB2009/000578
§ 371 (c)(1),
(2), (4) Date: Dec. 29, 2009

(87) PCT Pub. No.: WO2009/118603
PCT Pub. Date: Oct. 1, 2009

(65) Prior Publication Data
US 2010/0152915 A1    Jun. 17, 2010

(30) Foreign Application Priority Data
Mar. 24, 2008    (JP) .................................. 2008-074989

(51) Int. Cl.
*G06F 7/00*    (2006.01)
(52) U.S. Cl. .......................................... 701/22; 701/36
(58) Field of Classification Search ............... 701/1, 21, 701/36; 307/9.1, 10.1, 10.6, 11, 31, 32; 700/296, 700/286, 295; 180/65.1, 65.265
See application file for complete search history.

(56) References Cited

U.S. PATENT DOCUMENTS

| 7,173,347 B2 * | 2/2007 | Tani et al. ..................... 307/10.1 |
| 7,564,145 B2 * | 7/2009 | Moriya et al. .................. 307/9.1 |
| 8,030,881 B2 * | 10/2011 | Owens et al. ................. 320/104 |
| 8,148,924 B2 * | 4/2012 | Ohkuwa et al. ................. 318/34 |

(Continued)

FOREIGN PATENT DOCUMENTS

| JP | A 2003-118511 | 4/2003 |
| JP | A 2004-194495 | 7/2004 |

(Continued)

OTHER PUBLICATIONS

International Search Report issued for International Application No. PCT/IB2009/000578 on Jul. 30, 2009.

(Continued)

*Primary Examiner* — John Q Nguyen
*Assistant Examiner* — Michael Whalen
(74) *Attorney, Agent, or Firm* — Oliff & Berridge, PLC

(57) ABSTRACT

An operation controller controls operations of a plurality of electrical loads mounted on a vehicle and includes a start-up request accepting unit and a start-up coordinating unit. The start-up request accepting unit accepts a start-up request from the electrical loads. The start-up coordinating unit: controls start-up of the electrical load, from which the start-up request is output, on the basis of a priority assigned to the electrical load; outputs a signal for restricting start-up to a first electrical load having a relatively high priority, when the start-up request accepting unit accepts the start-up request from a second electrical load having a relatively low priority; and allows the second electrical load to start up, when the first electrical load is stopped after a predetermined waiting time elapses since the signal has been output.

15 Claims, 7 Drawing Sheets

U.S. PATENT DOCUMENTS

| | | | |
|---|---|---|---|
| 2004/0124703 A1* | 7/2004 | Tani et al. | 307/10.1 |
| 2004/0232769 A1* | 11/2004 | Pickering | 307/10.1 |
| 2007/0075584 A1* | 4/2007 | Moriya et al. | 307/9.1 |
| 2008/0197698 A1 | 8/2008 | Gehring et al. | |
| 2009/0102425 A1* | 4/2009 | Takahashi | 320/136 |

FOREIGN PATENT DOCUMENTS

| | | |
|---|---|---|
| JP | A-2007-504987 | 3/2007 |
| JP | A-2008-49982 | 3/2008 |
| WO | WO 02/087053 A1 | 10/2002 |
| WO | WO 2005/028258 A1 | 3/2005 |

OTHER PUBLICATIONS

Written Opinion issued for International Application No. PCT/IB2009/000578 on Jul. 30, 2009.

Japanese-language Office Action issued on Dec. 16, 2009 in Japanese Patent Application No. 2008-074989 with English-language translation.

* cited by examiner

OPERATION CONTROLLER AND METHOD OF CONTROLLING OPERATIONS

BACKGROUND OF THE INVENTION

1. Field of the Invention

The invention relates to an operation controller that controls operations of electrical loads and, more particularly, to an operation controller for a vehicle, which coordinates operations of a plurality of electrical loads mounted on the vehicle. The invention relates to a method of controlling operations of electrical loads.

2. Description of the Related Art

Vehicles, such as automobiles, are equipped with various electrical loads for controlling a driving mechanism, such as an internal combustion engine, a motor and a transmission, an operating mechanism related to a driving operation, and the like. These electrical loads assume an important role and greatly influence the running performance and drivability of vehicles. In addition, some of these electrical loads include an actuator, such as a motor, that has large start-up and operating electric power and, therefore, a necessary amount of power supply in a vehicle overall has been increasing.

Japanese Patent Application Publication No. 2004-194495 (JP-A-2004-194495), for example, suggests a vehicle load drive controller that distributes electric power respectively to such electrical loads. The vehicle load drive controller described in JP-A-2004-194495 calculates the amount of electric power that can be supplied by a power source mounted on a vehicle and, on the basis of a predetermined priority of each electrical load, supplies electric power to distributable electrical loads.

Here, the vehicle load drive controller described in JP-A-2004-194495 preferentially supplies electric power to an electrical load having a higher priority on the basis of the predetermined priority of each electrical load among electrical loads from which a start-up request is issued. However, after supply of electric power to an electrical load is allowed, supply of electric power to another electrical load having a higher priority may be additionally carried out. In this case, it is presumable that supply of electric power becomes excessive and, as a result, the limited amount of electric power of a vehicle is insufficient.

SUMMARY OF THE INVENTION

The invention provides an operation controller that is able to stably supply electric power to a plurality of electrical loads mounted on a vehicle by optimally coordinating operations of the electrical loads.

A first aspect of the invention provides an operation controller that controls a plurality of electrical loads mounted on a vehicle and having assigned priorities. The operation controller includes start-up request accepting means and start-up coordinating means. The start-up request accepting means accepts a start-up request from the electrical loads. The start-up coordinating means controls start-up of the electrical load, from which the start-up request is output, on the basis of the priority assigned to the electrical load. When the start-up request accepting means accepts the start-up request from a second electrical load having the relatively low priority among the plurality of electrical loads, the start-up coordinating means outputs a signal for restricting start-up to a first electrical load having the relatively high priority among the plurality of electrical loads. When the first electrical load is stopped after a predetermined waiting time elapses since the signal has been output, the start-up coordinating means controls the second electrical load to start up.

With the above configuration, when starting up the second electrical load having the relatively low priority, a signal for restricting start-up is output to the first electrical load having the relatively high priority and then the second electrical load is allowed to start up after a lapse of a period of time during which the start-up restriction on the first electrical load is carried out. Thus, it is possible to prevent a situation that a plurality of electrical loads start up overlappingly.

In the operation controller according to the above aspect, when the start-up request accepting means accepts the start-up request from the second electrical load and when the first electrical load is stopped at that time, the start-up coordinating means may output a signal for restricting start-up to the first electrical load.

With the above configuration, when the second electrical load outputs a start-up request, start-up of the second electrical load is restricted when the first electrical load is in operation. Thus, it is possible to prevent a situation that a plurality of systems operate overlappingly.

In the operation controller according to the above aspect, the waiting time may at least include a transmission time required to transmit a signal from the operation controller to the first electrical load.

With the above configuration, the waiting time is set in consideration of a transmission time required to transmit a signal from the operation controller to the first electrical load. Thus, it is possible to prevent a situation that a plurality of systems operate overlappingly because of a delay of communication when start-up restriction is transmitted.

In the operation controller according to the above aspect, the waiting time may further include a reception time required to transmit a signal from the first electrical load to the operation controller.

With the above configuration, the waiting time is set additionally in consideration of a reception time required to transmit a signal from the first electrical load to the operation controller. Thus, it is possible to prevent a situation that a plurality of systems operate overlappingly because of a delay of communication when information indicating start-up, or the like, is received.

In the operation controller according to the above aspect, the waiting time may further include a processing time during which the first electrical load accepts a signal from the operation controller and then processes the signal.

With the above configuration, the waiting time is set additionally in consideration of a processing time of the first electrical load. Thus, it is possible to prevent a situation that a plurality of systems operate overlappingly because of the processing time.

The operation controller according to the above aspect may further include power source determination means. The power source determination means may determine whether the power supply capacity of a battery mounted on the vehicle is sufficient. When the power source determination means determines that the power supply capacity of the battery is sufficient, the start-up coordinating means may allow the first electrical load and the second electrical load to start up. When the power source determination means determines that the power supply capacity of the battery is insufficient, the start-up coordinating means may allow the first electrical load to start up and output a signal for restricting start-up to the second electrical load. When the start-up coordinating means outputs the signal for restricting start-up to the second electrical load, the start-up request accepting means may accept the start-up request from the second electrical load.

With the above configuration, it is possible to appropriately coordinate start-up on the basis of the power supply capacity of the battery.

In the operation controller according to the above aspect, when the start-up request accepting means accepts the start-up request from the second electrical load, the start-up coordinating means may output a signal for restricting start-up to the first electrical load, and, when the first electrical load is being started up or in operation after the waiting time elapses since the signal has been output, the start-up coordinating means may allow the first electrical load to start up again and continuously output a signal for restricting start-up to the second electrical load.

With the above configuration, even when the first electrical load and the second electrical load request start-up at substantially the same timing, it is possible to perform coordination by assigning the highest priority to start-up and operation of the first electrical load having a higher priority.

In the operation controller according to the above aspect, when the start-up request accepting means accepts the start-up request from the electrical load at the time when another electrical load is in operation, the start-up coordinating means may control the electrical load, from which the start-up request is issued, to start up after the another electrical load stops.

With the above configuration, when the electrical load outputs a start-up request, start-up of the electrical load, from which the start-up request is output, is restricted when another electrical load is in operation. Thus, it is possible to prevent a situation that a plurality of systems operate overlappingly.

In the operation controller according to the above aspect, start-up of the second electrical load, for which the start-up request accepting means accepts the start-up request, may be restricted by the start-up coordinating means in advance.

In the operation controller according to the above aspect, the power source determination means may determine, on the basis of any one of a voltage value of the battery or both a voltage value of the battery and an output electric current value of the battery.

In the operation controller according to the above aspect, the power source determination means may determine, on the basis of a temperature of the battery, whether the power supply capacity of the battery is sufficient, and, when the temperature is lower than or equal to a predetermined temperature, the power source determination means may determine that the power supply capacity of the battery is insufficient.

In the operation controller according to the above aspect, when the electrical load is in operation and when the start-up coordinating means outputs a signal for restricting start-up of the electrical load, the electrical load in operation may continue the operation.

A second aspect of the invention provides a method of controlling operations of a plurality of electrical loads mounted on a vehicle and having assigned priorities. The method includes: accepting a start-up request from the plurality of electrical loads; controlling start-up of the electrical load, from which the start-up request is output, on the basis of the priorities; when the start-up request is output from a second electrical load which has the relatively low priority among the plurality of electrical loads and of which start-up is restricted in advance, restricting start-up of a first electrical load which has the relatively high priority among the plurality of electrical loads; and when the first electrical load is stopped after a predetermined waiting time elapses since start-up of the first electrical load has been restricted, controlling the second electrical load to start up.

The method according to the above aspect may further include: determining whether the power supply capacity of a battery mounted on the vehicle is sufficient; when it is determined that the power supply capacity of the battery is sufficient, allowing the first electrical load and the second electrical load to start up; and when it is determined that the power supply capacity of the battery is insufficient, allowing the first electrical load to start up and restricting start-up of the second electrical load.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, an electric power supply system that includes an operation controller according to an embodiment of the invention will be described with reference to FIG. 1. Typically, the operation controller is mounted on a vehicle, such as an automobile. Note that FIG. 1 is a schematic configuration diagram that shows an example of the configuration of the electric power supply system that includes the operation controller.

Figure 1:
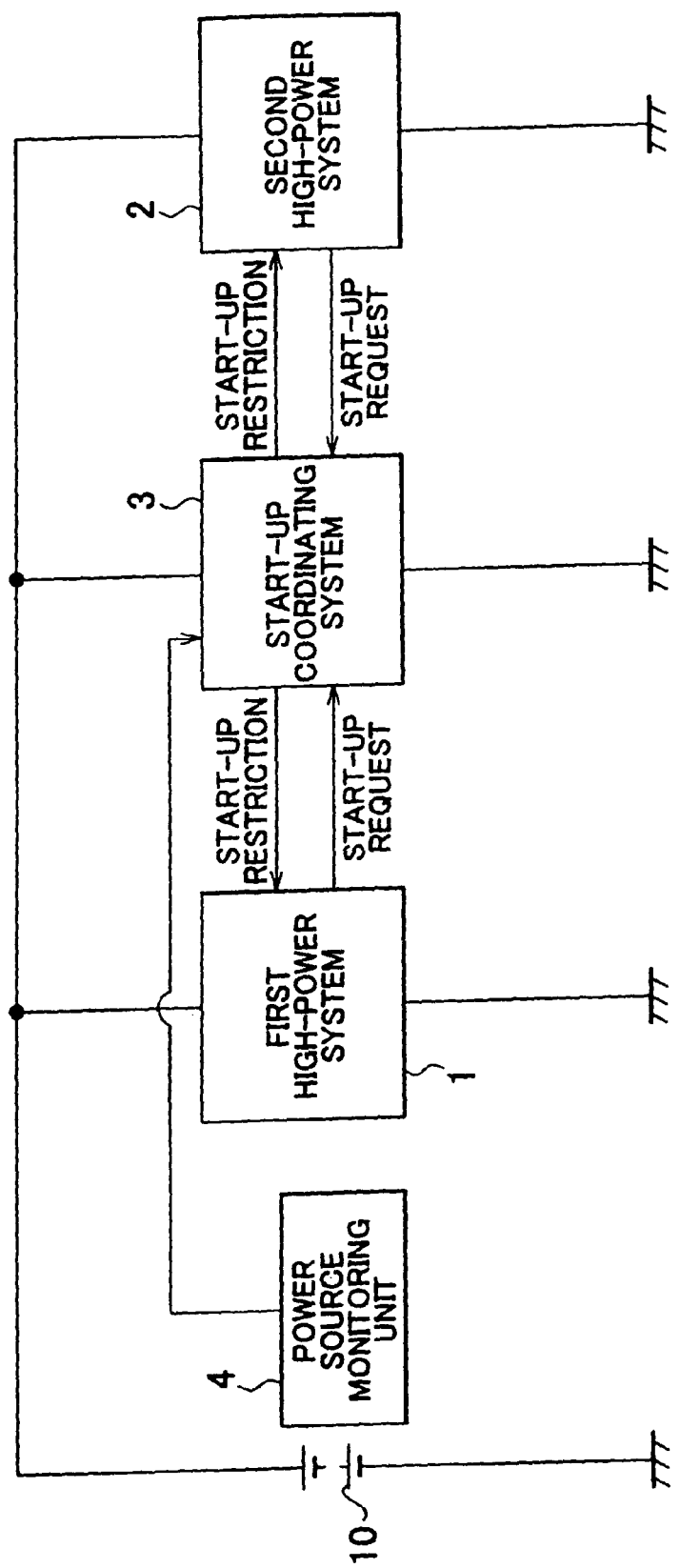
FIG. 1 is a schematic configuration diagram that shows an example of the configuration of an electric power supply system that includes an operation controller according to an embodiment of the invention.

As shown in FIG. 1, the electric power supply system that includes the operation controller includes a first high-power system 1, a second high-power system 2, a start-up coordinating system 3, a power source monitoring unit 4, and a battery 10. In the electric power supply system, electric power stored in the battery 10 is at least supplied to the first high-power system 1, the second high-power system 2 and the start-up coordinating system 3.

The battery 10 is an electric storage device that stores electric power generated by an alternator (not shown) and that supplies the stored electric power to the first high-power system 1, the second high-power system 2 and the start-up coordinating system 3. The battery 10 employs, for example, a lead-acid battery having a rated voltage of about 12 V. Instead, another secondary battery (for example, a nickel-hydrogen battery or a lithium-ion battery) may also be used.

The first high-power system 1 and the second high-power system 2 are examples of a plurality of electrical loads mounted on the vehicle for controlling a driving mechanism, such as an internal combustion engine, a motor, and a transmission, an operating mechanism related to a driving operation, and the like. For example, the first high-power system 1 and the second high-power system 2 each include an actuator, such as a motor, that has large start-up and operating electric power. The first high-power system 1 and the second high-power system 2 each require relatively large start-up, and operating electric power. Specifically, an air injection (AI) system, a sequential manual transmission (SMT) system, a brake assist system, and the like, correspond to examples of the first high-power system 1 and the second high-power system 2.

The air injection system promotes combustion by introducing air from an air cleaner of the vehicle to an engine exhaust system. To operate the air injection system, it is necessary to ensure electric power for starting up an air injection pump, which introduces secondary air to the engine exhaust system, to operate.

In addition, the sequential manual transmission system shifts gears (speed ratios) of the transmission using hydraulic pressure accumulated in an accumulator. The sequential manual transmission system drives a drive motor to accumulate pressure in the accumulator. To operate the sequential manual transmission system, it is necessary to ensure electric power for starting up the drive motor to operate.

In addition, the brake assist system pressurizes brake hydraulic pressure on the basis of a force by which a driver depresses a brake pedal. To operate the brake assist system, it is necessary to ensure electric power for starting up a pump or a motor, which is used to pressurize brake hydraulic pressure, to operate.

Note that the first high-power system 1 and the second high-power system 2 each are allowed to start up on the basis of whether start-up restriction is output from the start-up coordinating system 3. Then, the start-up coordinating system 3 presets priorities related to start-up for the first high-power system 1 and the second high-power system 2. In the following description, the first high-power system 1 has the assigned highest priority for start-up, and the second high-power system 2 has an assigned priority for start-up, which is lower than that of the first high-power system 1.

The power source monitoring unit 4 is formed of various devices that detect the state of charge of the battery 10, and outputs the detected state of charge to the start-up coordinating system 3. For example, the power source monitoring unit 4 is formed of at least one of an electric current sensor that detects an electric current output from the battery 10, a temperature sensor that detects a temperature of the battery 10, and a voltage sensor that detects a voltage of the battery 10. Note that the voltage of the battery 10 may be detected through a voltage supplied from the battery 10 to the start-up coordinating system 3, so a voltage detecting unit that detects the battery voltage may be provided in the start-up coordinating system 3.

The start-up coordinating system 3 is a controller that coordinates start-up of the first high-power system 1 and start-up of the second high-power system 2 on the basis of operating states of the first high-power system 1 and second high-power system 2, state of charge of the battery 10, or the like. The start-up coordinating system 3 is formed of an electronic control unit, or the like. Then, the start-up coordinating system 3 is connected to the first high-power system 1 and the second high-power system 2 via an in-vehicle LAN (for example, controller area network (CAN)) that enables information transmission or a connection line (direct line). For example, the start-up coordinating system 3 determines the power supply capacity of the battery 10 on the basis of information related to the battery 10 (battery 10—related information), which is output from the power source monitoring unit 4. In addition, the start-up coordinating system 3 accepts start-up request signals respectively from the first high-power system 1 and the second high-power system 2. Furthermore, the start-up coordinating system 3 outputs a start-up restriction state signal to the first high-power system 1 and/or the second high-power system 2 on the basis of the power supply capacity of the battery 10, whether the start-up request is issued, the operating states of the first high-power system 1 and second high-power system 2, or the like. Note that the start-up coordinating system 3 corresponds to an example of an operation controller according to the aspects of the invention.

Figure 2:
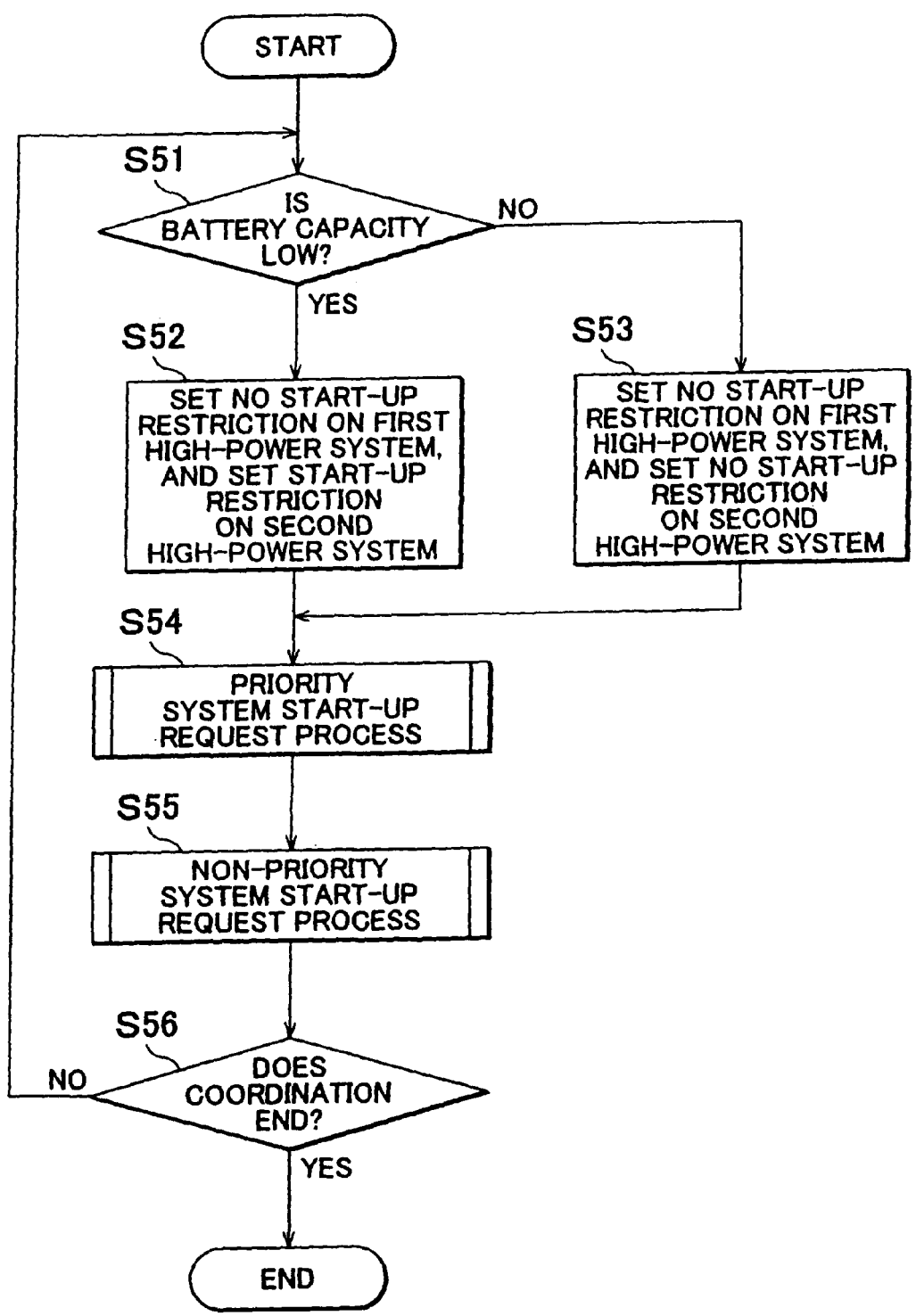
FIG. 2 is a flowchart that shows an example of an operation of a start-up coordinating system shown in FIG. 1.
Figure 3:
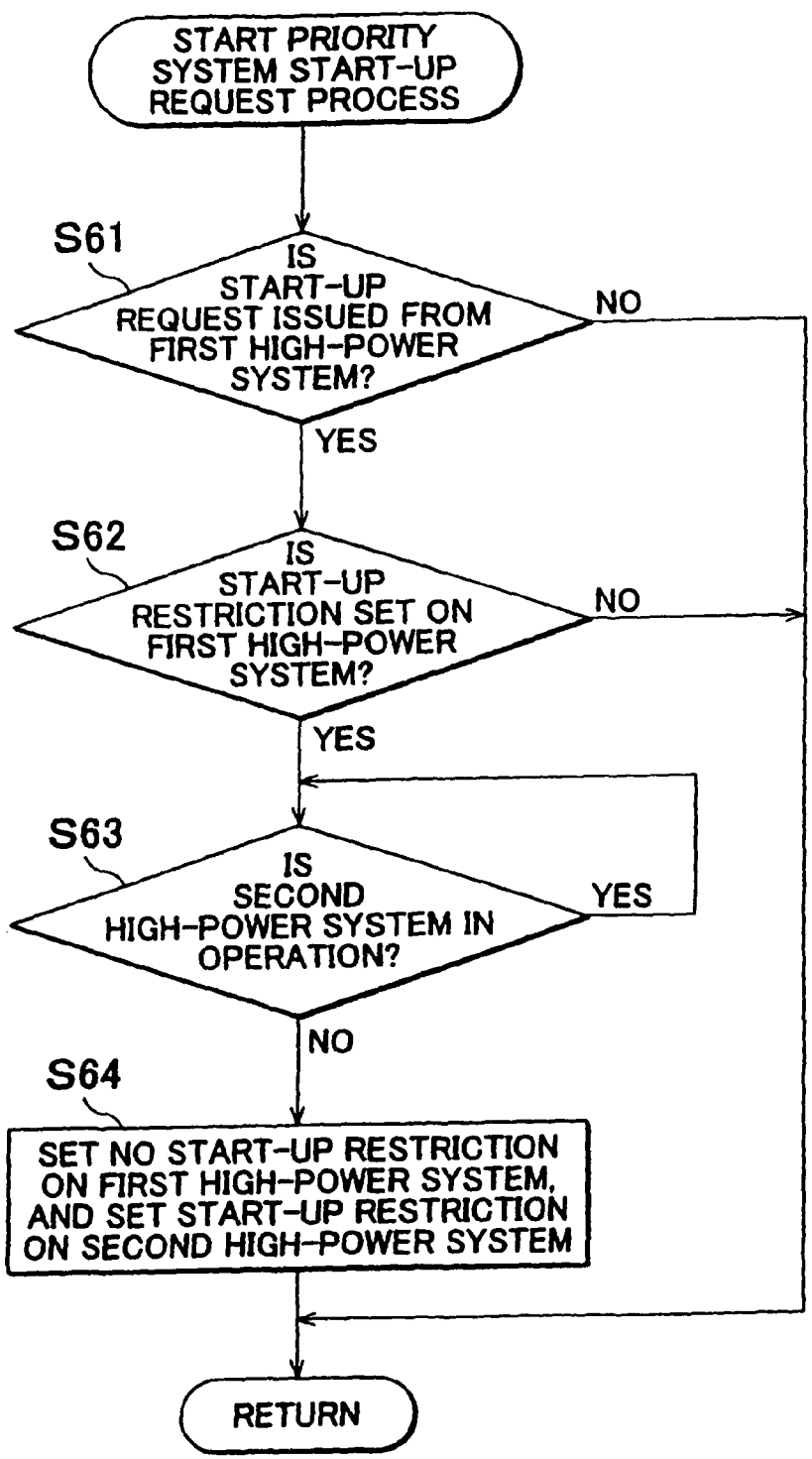
FIG. 3 is a subroutine that shows an example of a priority system start-up request process in step S54 of FIG. 2.
Figure 4:
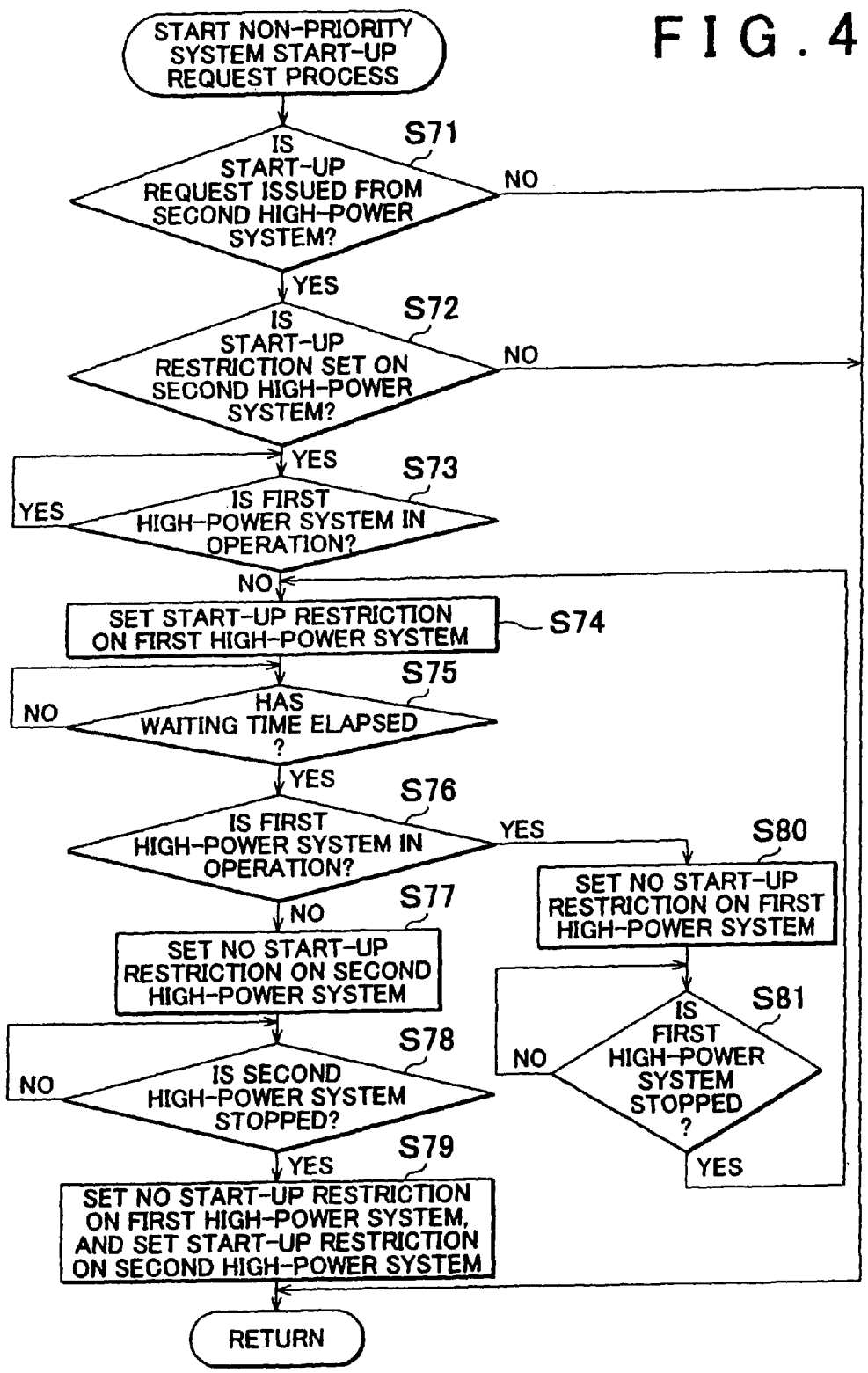
FIG. 4 is a subroutine that shows an example of a non-priority system start-up request process in step S55 of FIG. 2.

Next, the operation of the start-up coordinating system 3 will be described with reference to FIG. 2 to FIG. 4. Note that FIG. 2 is a flowchart that shows an example of the operation of the start-up coordinating system 3. FIG. 3 is a subroutine that shows an example of a priority system start-up request process in step S54 of FIG. 2. FIG. 4 is a subroutine that shows an example of a non-priority system start-up request process in step S55 of FIG. 2.

In FIG. 2, the start-up coordinating system 3 determines, on the basis of the battery 10—related information output from the power source monitoring unit 4, whether the power supply capacity of the battery 10 is low (insufficient) (step S51). When the power supply capacity of the battery 10 is low, the start-up coordinating system 3 proceeds to the next step S52. On the other hand, when the power supply capacity of the battery 10 is sufficient, the start-up coordinating system 3 proceeds to the next step S53. Hereinafter, a method of determining the power supply capacity of the battery 10 in step S51 will be described.

For example, the start-up coordinating system 3 uses a voltage value of the battery 10 (battery voltage value), included in the battery 10—related information output from the power source monitoring unit 4. Then, when the battery voltage value is lower than or equal to a threshold (for example, 11 V), the start-up coordinating system 3 determines that the power supply capacity of the battery 10 is low.

For example, the start-up coordinating system 3 uses an output electric current value and voltage value of the battery 10, which are included in the battery 10—related information output from the power source monitoring unit 4. Then, the start-up coordinating system 3 calculates a battery charging rate using the current-voltage characteristic of the battery 10, and, when the battery charging rate is lower than or equal to a threshold (for example, 50%), determines that the power supply capacity of the battery 10 is low. The battery charging rate may be calculated using a battery voltage value at the time when the output electric current value of the battery 10 is 0 A.

For example, the start-up coordinating system 3 uses the temperature of the battery 10, included in the battery 10—related information output from the power source monitoring unit 4. Then, when the temperature of the battery 10 is lower than or equal to a threshold (for example, 0° C.), the start-up coordinating system 3 determines that the power supply capacity of the battery 10 is low. In this third example, because the lead-acid battery generally has a characteristic that the discharge capacity decreases as the battery temperature decreases, this characteristic is used to determine the power supply capacity.

For example, the start-up coordinating system 3 uses an output electric current value and voltage value of the battery 10, included in the battery 10—related information output from the power source monitoring unit 4. Then, the start-up coordinating system 3 calculates a battery internal resistance value using the current-voltage characteristic of the battery 10 and, when the battery internal resistance value is higher than or equal to a threshold (for example, 10 mΩ), determines that the power supply capacity of the battery 10 is low. The battery internal resistance value may be calculated using the slope of the current-voltage characteristic of the battery 10.

For example, the start-up coordinating system 3 uses an output electric current value and voltage value of the battery 10, included in the battery 10—related information output from the power source monitoring unit 4. Then, when a difference between a predetermined allowable discharge electric current value, corresponding to a current battery voltage value, and a current output electric current value is smaller than a threshold (for example, 30 A), the start-up coordinating system 3 determines that the power supply capacity of the battery 10 is low. Note that the battery allowable discharge electric current value is an index that indicates how much electric current may be discharged on the basis of a battery state, and is a predetermined value corresponding to a battery voltage.

For example, the start-up coordinating system 3 uses an output electric current value and voltage value of the battery 10, included in the battery 10—related information output from the power source monitoring unit 4. Then, when a predetermined electric current limiting value of the battery 10 corresponding to a current battery voltage value is smaller than a threshold (for example, 0 A), the start-up coordinating system 3 determines that the power supply capacity of the battery 10 is low. Here, the electric current limiting value is an electric current value by which it is determined whether the battery voltage value is lower than a target voltage of the battery 10 when the first high-power system 1 or the second high-power system 2 is started up. The electric current limiting value is calculated from the following mathematical expression.

Electric current limiting value=Allowable discharge electric current value−Current output electric current value−Electric current value required by a target system Then, when the electric current limiting value is smaller than 0 A, that is, when the allowable discharge electric current value is smaller than the sum of the current output electric current value and the electric current value required by a target system, it is determined that the power supply capacity of the battery 10 is low.

In step S52, the start-up coordinating system 3 sets no start-up restriction on the first high-power system 1, and sets start-up restriction on the second high-power system 2, and then outputs start-up restriction state signals indicating those start-up restriction states respectively to the first high-power system 1 and the second high-power system 2. That is, in step S52, when the power supply capacity of the battery 10 is low, start-up restriction is set only on the second high-power system 2 having a relatively low priority. Then, the start-up coordinating system 3 proceeds to the next step S54.

On the other hand, in step S53, the start-up coordinating system 3 sets no start-up restriction on the first high-power system 1, and sets no start-up restriction on the second high-power system 2, and then outputs start-up restriction state signals indicating those start-up restriction states respectively to the first high-power system 1 and the second high-power system 2. That is, in step S53, when the power supply capacity of the battery 10 is sufficient, no start-up restriction is set on both the first high-power system 1 and the second high-power system 2. Then, the start-up coordinating system 3 proceeds to the next step S54.

In step S54, the start-up coordinating system 3 executes priority system start-up request process, and then proceeds to the next step. Hereinafter, the detailed operations of the priority system start-up request process executed by the start-up coordinating system 3 will be described with reference to FIG. 3.

In FIG. 3, the start-up coordinating system 3 determines whether a start-up request is issued from the first high-power system 1 (step S61). As will be apparent from the following description, when the first high-power system 1 attempts to start up its own actuator, the first high-power system 1 outputs a start-up request signal to the start-up coordinating system 3. Then, when the start-up coordinating system 3 receives the start-up request signal from the first high-power system 1, the start-up coordinating system 3 proceeds to the next step S62. On the other hand, when the start-up coordinating system 3 receives no start-up request signal from the first high-power system 1, the start-up coordinating system 3 ends the subroutine.

In step S62, the start-up coordinating system 3 determines whether start-up restriction is set on the first high-power system 1. Then, when start-up restriction is set on the first high-power system 1, the start-up coordinating system 3 proceeds to the next step S63. On the other hand, when no start-up restriction is set on the first high-power system 1, the start-up coordinating system 3 ends the subroutine.

In step S63, the start-up coordinating system 3 determines whether the actuator of the second high-power system 2 is in operation. Then, when the actuator of the second high-power system 2 is not in operation or when the actuator of the second high-power system 2 is stopped, the start-up coordinating system 3 proceeds to the next step S64. On the other hand, when the actuator of the second high-power system 2 is started up and in operation, the start-up coordinating system 3 waits until the actuator of the second high-power system 2 stops. Hereinafter, a method of determining in step S63 whether the actuator of the second high-power system 2 is in operation will be described.

For example, the start-up coordinating system 3 determines, on the basis of a period of time that elapses since the actuator of the second high-power system 2 has started up, whether the actuator of the second high-power system 2 is in operation. As is apparent from the following description, when start-up restriction is set on the second high-power system 2, the second high-power system 2 outputs a start-up trigger (start-up request signal) of its own system and waits until start-up restriction is removed. Then, the second high-power system 2 initiates start-up of the actuator as the start-up restriction state is changed into no start-up restriction. Thus, the start-up coordinating system 3 counts a period of time that elapses since the start-up restriction state of the second high-power system 2 has been changed into no start-up restriction in a state where the start-up coordinating system 3 has acquired a start-up request signal from the second high-power system 2. Hence, it is possible to obtain a period of time that elapses since the actuator of the second high-power system 2 has started up. In addition, as will be apparent from the following description, when no start-up restriction is set on the second high-power system 2, the second high-power system 2 outputs a start-up request signal and simultaneously initiates start-up of the actuator immediately. Thus, when no start-up restriction is set on the second high-power system 2, the start-up coordinating system 3 counts a period of time that elapses since the start-up coordinating system 3 has acquired the start-up request signal from the second high-power system 2 to thereby make it possible to obtain a period of time that elapses since the actuator of the second high-power system 2 has started up.

For example, as the start-up request signal output from the second high-power system 2 turns off, the start-up coordinating system 3 determines that the actuator of the second high-power system 2 stops. As will be apparent from the following description, when the second high-power system 2 stops its own actuator, the second high-power system 2 cancels the request for start-up of its own system to turn off the output of the start-up request signal, thus stopping the actuator. In addition, when the second high-power system 2 has no request for operating its own actuator, the second high-power system 2 does not output a start-up request signal. Thus, the start-up coordinating system 3 detects that the start-up request signal received from the second high-power system 2 is turned off to recognize that the actuator of the second high-power system 2 is stopped.

For example, the start-up coordinating system 3 monitors the output electric current waveform of the battery 10, detects an electric current waveform caused by start-up and operation of the actuator of the second high-power system 2, and then detects that the actuator of the second high-power system 2 ends the operation or is not in operation (that is, the actuator of the second high-power system 2 is neither in starting up nor in operation). For example, the start-up coordinating system 3 is able to monitor the output electric current waveform of the battery 10 by using the output electric current value of the battery 10, included in the battery 10—related information output from the power source monitoring unit 4.

In step S64, the start-up coordinating system 3 sets no start-up restriction on the first high-power system 1, and sets start-up restriction on the second high-power system 2, and then outputs start-up restriction state signals indicating those start-up restriction states respectively to the first high-power system 1 and the second high-power system 2. Then, after the process in step S64, the start-up coordinating system 3 ends the subroutine.

Referring back to FIG. 2, after the priority system start-up request process in step S54, the start-up coordinating system 3 executes non-priority system start-up request process (step S55), and then proceeds to the next step. Hereinafter, the detailed operations of the non-priority system start-up request process executed by the start-up coordinating system 3 will be described with reference to FIG. 4.

In FIG. 4, the start-up coordinating system 3 determines whether a start-up request is issued from the second high-power system 2 (step S71). As will be apparent from the following description, when the second high-power system 2 attempts to start up its own actuator, the second high-power system 2 also outputs a start-up request signal to the start-up coordinating system 3. Then, when the start-up coordinating system 3 receives the start-up request signal from the second high-power system 2, the start-up coordinating system 3 proceeds to the next step S72. On the other hand, when the start-up coordinating system 3 receives no start-up request signal from the second high-power system 2, the start-up coordinating system 3 ends the subroutine.

In step S72, the start-up coordinating system 3 determines whether start-up restriction is set on the second high-power system 2. Then, when start-up restriction is set on the second high-power system 2, the start-up coordinating system 3 proceeds to the next step S73. On the other hand, when no start-up restriction is set on the second high-power system 2, the start-up coordinating system 3 ends the subroutine.

In step S73, the start-up coordinating system 3 determines whether the actuator of the first high-power system 1 is in operation. Then, when the actuator of the first high-power system 1 is not in operation or when the actuator of the first high-power system 1 is stopped, the start-up coordinating system 3 proceeds to the next step S74. On the other hand, when the actuator of the first high-power system 1 is started up and in operation, the start-up coordinating system 3 waits until the actuator of the first high-power system 1 stops. A method of determining in step S73 whether the actuator of the first high-power system 1 is in operation is similar to the method by which the start-up coordinating system 3 determines in step S63 whether the actuator of the second high-power system 2 is in operation, so the detailed description is omitted.

In step S74, the start-up coordinating system 3 sets start-up restriction on the first high-power system 1, and outputs a start-up restriction state signal indicating the start-up restriction state to the first high-power system 1. Then, the start-up coordinating system 3 proceeds to the next step.

Subsequently, the start-up coordinating system 3 waits until a waiting time WT elapses (step S75), and then proceeds to the next step S76. Here, the waiting time WT is a period of time for taking into consideration the case where the first high-power system 1 initiates start-up while the start-up restriction state signal indicating a start-up restriction state is being transmitted to the first high-power system 1, and is a period of time required for the first high-power system 1 to carry out start-up restriction.

For example, the waiting time WT is obtained by adding a transmission time, a processing time, and a reception time. The transmission time starts from the time when the start-up coordinating system 3 outputs a start-up restriction state signal to the time when the first high-power system 1 receives the start-up restriction state signal. The processing time indicates a processing period, or the like, during which the first high-power system 1 carries out information processing. The reception time starts from the time when the first high-power system 1 outputs a start-up request signal to the time when the start-up coordinating system 3 receives the start-up request signal. Here, the transmission time and the reception time are periods of time required for communication between the start-up coordinating system 3 and the first high-power system 1. The processing time is a period of time (for example, a period of time during which the first high-power system 1 determines that no start-up restriction is set thereon and then outputs a start-up request signal to the start-up coordinating system 3) that is required for the first high-power system 1 to carry out a series of processes.

Note that the transmission time, reception time and processing time, which are added to obtain the waiting time WT, may be an average time expected in the electric power supply system or may be a maximum time. In addition, when the processing time is excessively shorter than the transmission time and the reception time, the waiting time WT may be calculated by adding only the expected transmission time and reception time. In addition, depending on a communication mode between the start-up coordinating system 3 and the first high-power system 1, the waiting time WT may be calculated by adding one of the transmission time and the reception time to the processing time. For example, when event communication is carried out between the start-up coordinating system 3 and the first high-power system 1, the waiting time WT may be calculated by adding the transmission time to the processing time.

In step S76, the start-up coordinating system 3 determines whether the actuator of the first high-power system 1 is being started up or in operation. When the actuator of the first high-power system 1 is stopped, that is, neither being started up nor in operation, the start-up coordinating system 3 proceeds to the next step S77. On the other hand, when the actuator of the first high-power system 1 is being started up or in operation, the start-up coordinating system 3 proceeds to the next step S80.

A method of determining in step S76 whether the actuator of the first high-power system 1 is being started up or in operation or not may use the start-up request signal output from the first high-power system 1 (the second example in step S63) or the output electric current waveform of the battery 10 (the third example in step S63). Specifically, when the start-up request signal output from the first high-power system 1 indicates start-up restriction or when the current waveform caused by start-up or operation of the actuator of the first high-power system 1 is detected, the start-up coordinating system 3 determines that the actuator of the first high-power system 1 is being started up or in operation. In addition, when the start-up request signal output from the first high-power system 1 indicates no start-up restriction or when no current waveform caused by start-up or operation of the actuator of the first high-power system 1 is detected, the start-up coordinating system 3 determines that the actuator of the first high-power system 1 is stopped.

In step S77, the start-up coordinating system 3 sets no start-up restriction on the second high-power system 2, and outputs a start-up restriction state signal indicating the start-up restriction state to the second high-power system 2, and then proceeds to the next step. In this way, the start-up restriction state signal indicating no start-up restriction is output to the second high-power system 2 to allow the actuator of the second high-power system 2 to start up.

Subsequently, the start-up coordinating system 3 determines whether the actuator of the second high-power system 2 is stopped (step S78). Then, when the actuator of the second high-power system 2 is stopped, the start-up coordinating system 3 proceeds to the next step S79. On the other hand, when the actuator of the second high-power system 2 is started up and in operation, the start-up coordinating system 3 waits until the actuator of the second high-power system 2 stops. A method of determining in step S78 whether the actuator of the second high-power system 2 is stopped is similar to that in step S63, so the detailed description thereof is omitted.

In step S79, the start-up coordinating system 3 sets no start-up restriction on the first high-power system 1 and sets start-up restriction on the second high-power system 2, and then outputs start-up restriction state signals indicating those start-up restriction states respectively to the first high-power system 1 and the second high-power system 2. After the process in step S79, the start-up coordinating system 3 ends the subroutine.

On the other hand, when it is determined in step S76 that the actuator of the first high-power system 1 is started up and in operation, the start-up coordinating system 3 sets no start-up restriction on the first high-power system 1 again, and outputs a start-up restriction state signal indicating the start-up restriction state to the first high-power system 1 (step S80). Then, the start-up coordinating system 3 proceeds to the next step.

After that, the start-up coordinating system 3 determines whether the actuator of the first high-power system 1 is stopped (step S81). Then, when the actuator of the first high-power system 1 is stopped, the start-up coordinating system 3 returns to step S74 to repeat the process. On the other hand, when the actuator of the first high-power system 1 is started up and in operation, the start-up coordinating system 3 waits until the actuator of the first high-power system 1 stops. A method of determining in step S81 whether the actuator of the first high-power system 1 is stopped is similar to the method of determining in step S63 whether the second high-power system 2 is in operation, so the detailed description thereof is omitted.

Referring back to FIG. 2, after the non-priority system start-up request process in step S55, the start-up coordinating system 3 determines whether to end coordination (step S56). For example, when the vehicle driver manually ends coordination (for example, turns off an ignition switch), the start-up coordinating system 3 determines to end coordination. Then, when the start-up coordinating system 3 continues the process, the start-up coordinating system 3 returns to step S51 to repeat the process. On the other hand, when the start-up coordinating system 3 ends the process, the start-up coordinating system 3 ends the process according to the flowchart.

Figure 5:
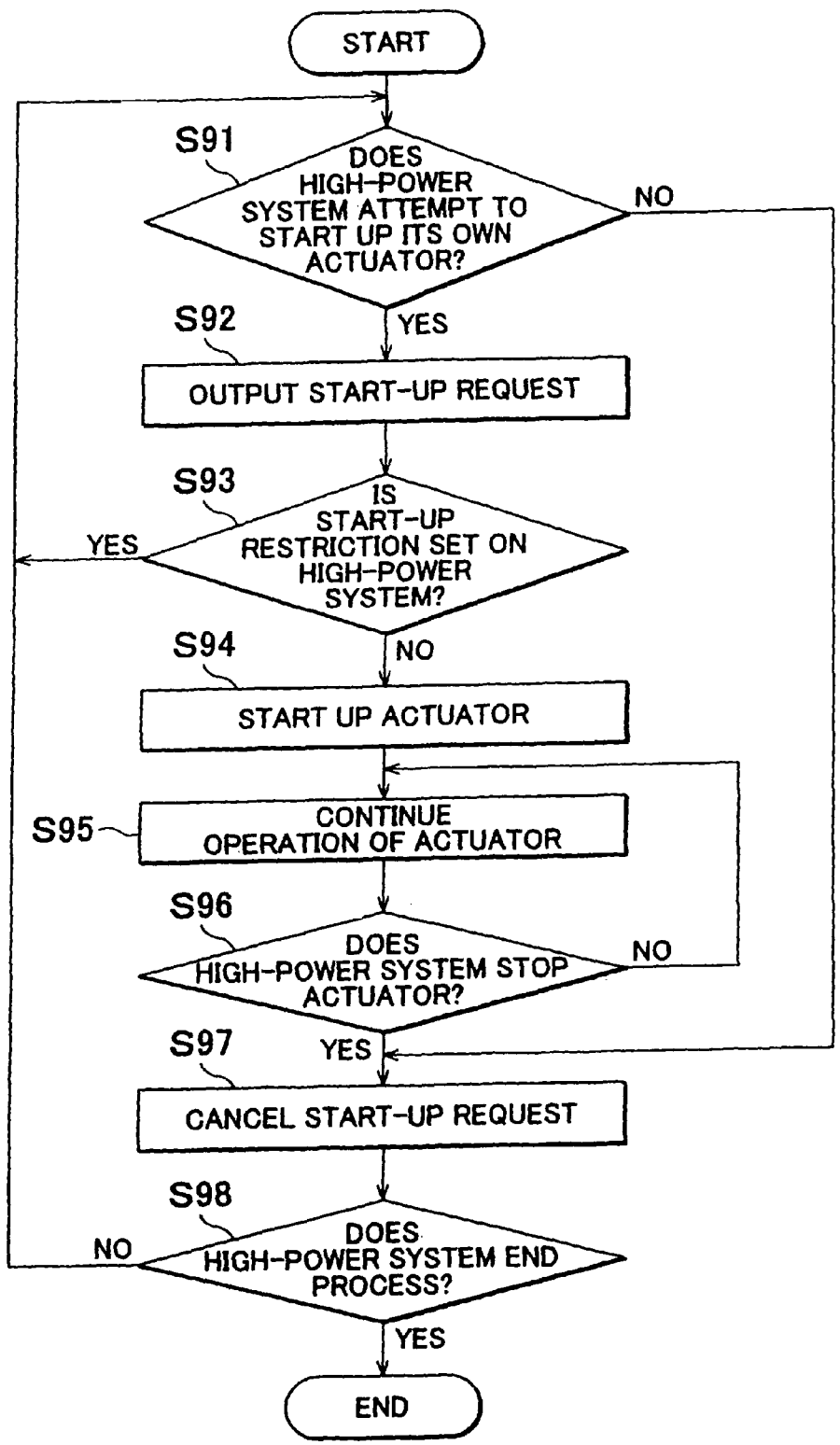
FIG. 5 is a flowchart that shows an example of operations of a first high-power system and second high-power system shown in FIG. 1.

The operations of the first high-power system 1 and second high-power system 2 will be described with reference to FIG. 5. Note that FIG. 5 is a flowchart that shows an example of operations of the first high-power system 1 and second high-power system 2. Note that, in the following description, the first high-power system 1 and the second high-power system 2 are generically referred to as a high-power system.

In FIG. 5, the high-power system determines whether to start up its own actuator (step S91). Then, when the high-power system attempts to start up the actuator, the high-power system proceeds to the next step S92. On the other hand, when the high-power system does not attempt to start up the actuator, the high-power system proceeds to the next step S97.

In step S92, the high-power system outputs a start-up request signal indicating a start-up request to the start-up coordinating system 3. Subsequently, the high-power system refers to a start-up restriction state signal output from the start-up coordinating system 3 to determine whether start-up restriction is set on the high-power system (step S93). Then, when no start-up restriction is set on high-power system, the high-power system proceeds to the next step S94. On the other hand, when start-up restriction is set on the high-power system, the high-power system returns to step S91 to repeat the process.

Next, the high-power system starts up its own actuator (step S94), and continues operation of the actuator depending on the operation condition of the actuator (step S95). Then, when the high-power system stops the actuator (Yes in step S96), the high-power system proceeds to the next step S97. On the other hand, when the high-power system continues operation of the actuator (No in step S96), the high-power system returns to step S95 to repeat the process. In this way, the high-power system refers to the start-up restriction state signal output from the start-up coordinating system 3 and, only when no start-up restriction is set on the self-system, can start up its own actuator. In addition, the high-power system continues the operation even when the start-up restriction state signal output from the start-up coordinating system 3 is changed into start-up restriction during operation of its own actuator.

In step S97, the high-power system cancels the start-up request, turns off the start-up request signal output to the start-up coordinating system 3, and then proceeds to the next step. Note that during the above described processes in step S94 to step S96, the start-up request signal indicating the start-up request is continuously output to the start-up coordinating system 3. That is, the start-up request signal indicating the start-up request is continuously output in a period during which the high-power system attempts to start up the actuator (start-up request period), a period during which the actuator is being started up (start-up period), and a period during which the actuator is started up and in operation (operation period).

After that, the high-power system determines whether to end the process (step S98). For example, when the vehicle driver manually ends coordination (for example, turns off an ignition switch), the high-power system determines to end the process. Then, when the high-power system continues the process, the high-power system returns to step S91 to repeat the process. On the other hand, when the high-power system ends the process, the high-power system ends the process according to the flowchart.

Figure 6:
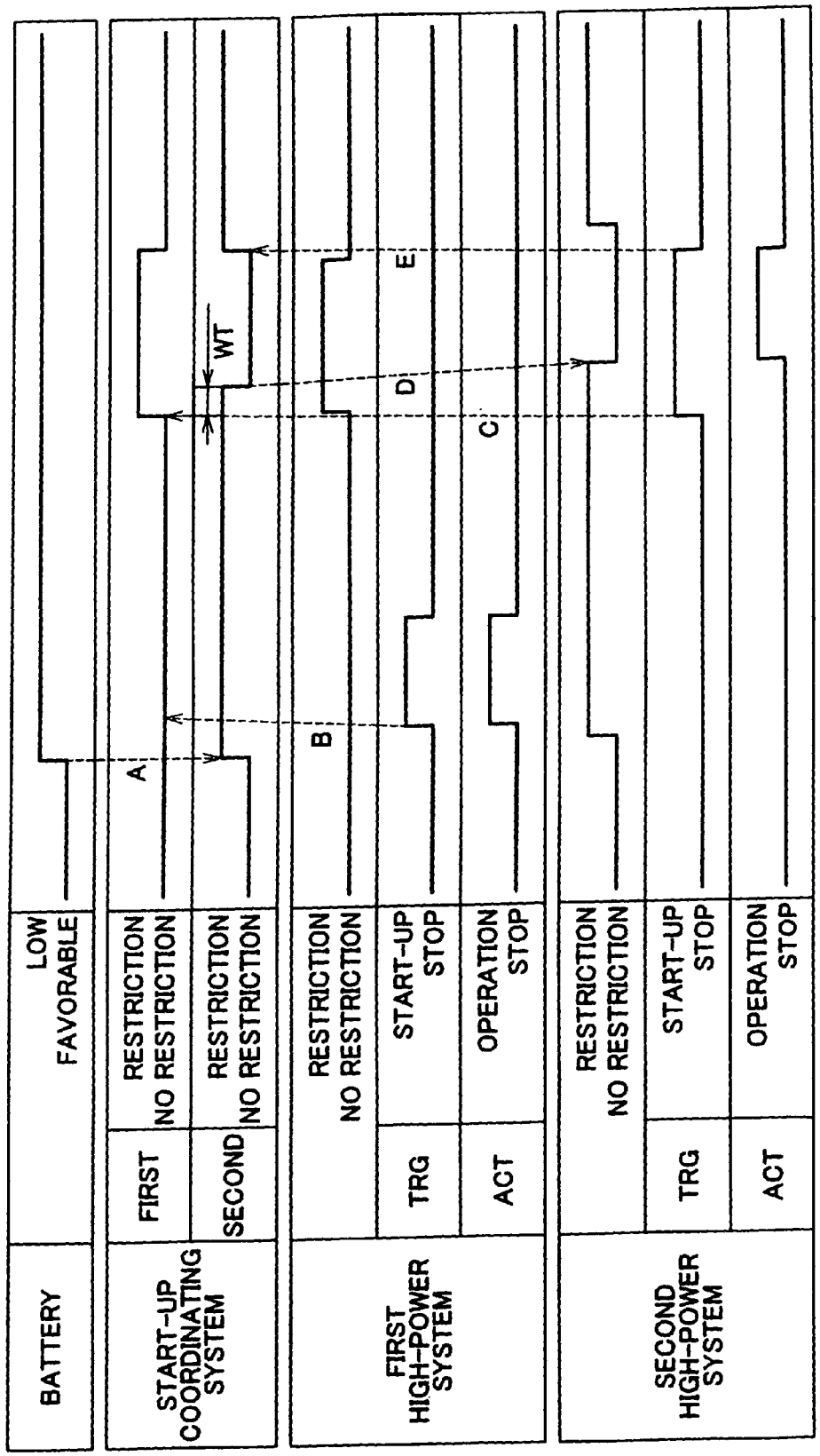
FIG. 6 is an example of a timing chart of operation control when the operations of the first high-power system and second high-power system are not overlapping according to the embodiment of the invention.
Figure 7:
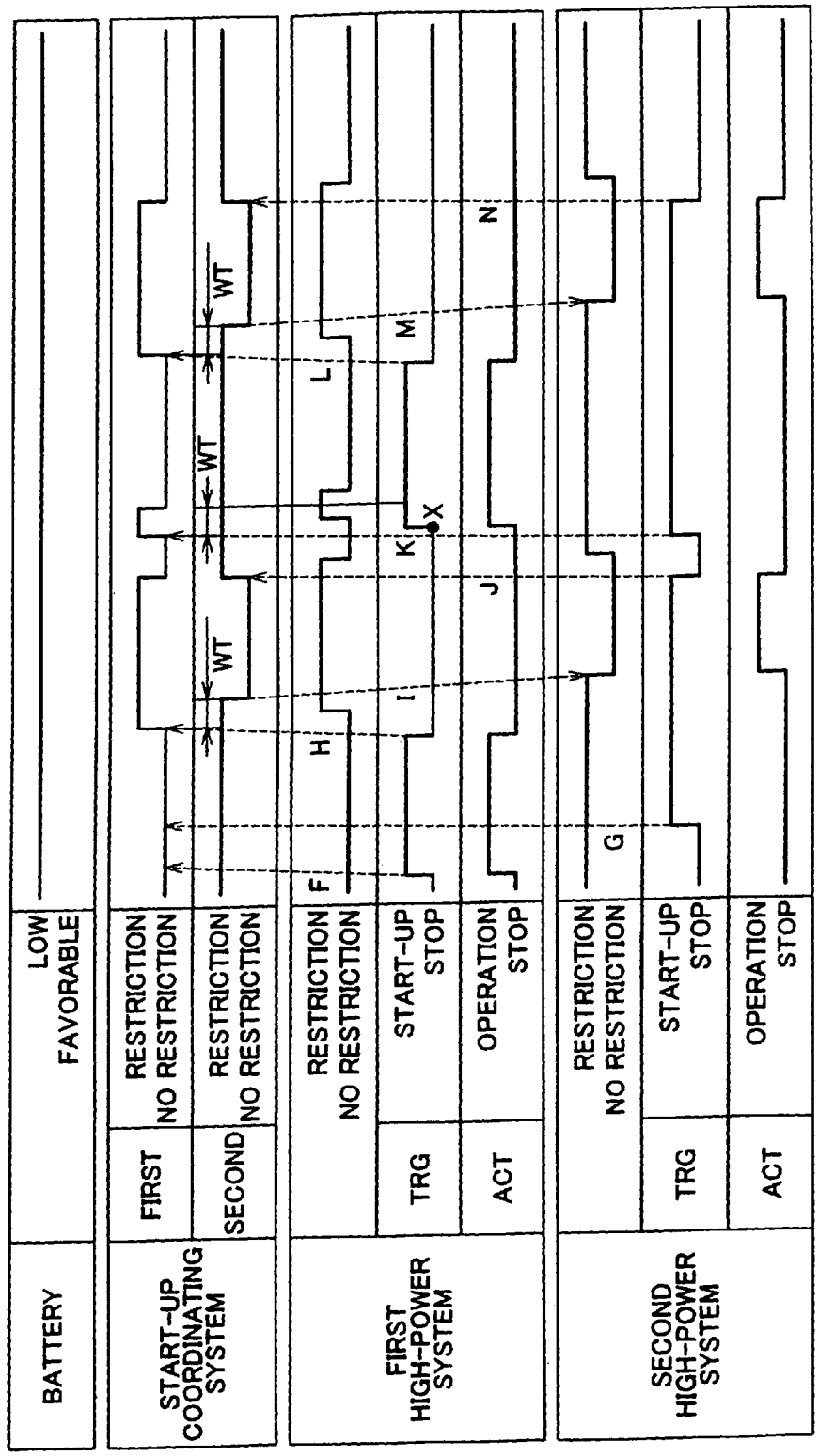
FIG. 7 is an example of a timing chart of operation control when the operations of the first high-power system and second high-power system are partially overlapping according to the embodiment of the invention.

Next, the operation timings of the electric power supply system according to the flowchart shown in FIG. 2 to FIG. 5 will be described with reference to FIG. 6 and FIG. 7. Note that FIG. 6 is an example of a timing chart of operation control when the operations of the first high-power system 1 and second high-power system 2 are not overlapping. FIG. 7 is an example of a timing chart of operation control when the operations of the first high-power system 1 and second high-power system 2 are partially overlapping. Here, the timing charts shown in FIG. 6 and FIG. 7 each show the operations and states of the systems with the abscissa axis representing time axis.

In FIG. 6, when the power supply capacity of the battery 10 is low (Yes in step S51), the start-up coordinating system 3 sets start-up restriction on the second high-power system 2 having a relatively low priority (step S52; arrow A in the drawing). Note that even when the power supply capacity of the battery 10 is low, the start-up coordinating system 3 continuously sets no start-up restriction on the first high-power system 1.

In this state, when the first high-power system 1 requests start-up, a start-up request (TRG in the drawing) is output from the first high-power system 1 to the start-up coordinating system 3 (step S92; arrow B in the drawing). Then, because no start-up restriction is set on the first high-power system 1 (No in step S93), the first high-power system 1 initiates start-up of the actuator (ACT in the drawing) immediately (step S94). Note that when the actuator is started up and in operation as well, no start-up restriction is continuously set on the first high-power system 1, and start-up restriction is continuously set on the second high-power system 2.

After the actuator of the first high-power system 1 is stopped, when the second high-power system 2 requests start-up, a start-up request is output from the second high-power system 2 to the start-up coordinating system 3 (step S92; arrow C in the drawing). At this time, because start-up restriction is set on the second high-power system 2, the second high-power system 2 is not allowed to start up the actuator (Yes in step S93). On the other hand, when the start-up coordinating system 3 receives the start-up request from the second high-power system 2, the start-up coordinating system 3 sets start-up restriction on the first high-power system 1 (step S74) and waits until the waiting time WT elapses (step S75). Then, as the waiting time WT has elapsed, the start-up coordinating system 3 determines whether the first high-power system 1 is not in operation (step S76) and then sets no start-up restriction on the second high-power system 2 (step S77; arrow D in the drawing). Then, when no start-up restriction is set on the second high-power system 2 (No in step S93), the second high-power system 2 initiates start-up of the actuator (step S94). Note that when the actuator is started up and in operation, start-up restriction is set on the first high-power system 1, and no start-up restriction is set on the second high-power system 2.

When the actuator of the second high-power system 2 stops (Yes in step S96), the start-up request from the second high-power system 2 is cancelled (step S97; arrow E in the drawing). Then, when the actuator of the second high-power system 2 stops (Yes in step S78), the start-up coordinating system 3 sets no start-up restriction on the first high-power system 1, and sets start-up restriction on the second high-power system 2 (step S79).

In FIG. 7, it is assumed that, after the first high-power system 1 requests start-up (step S92; arrow F in the drawing) and then starts up the actuator (step S94), the second high-power system 2 requests start-up (step S92; arrow G in the drawing) during operation of the actuator of the first high-power system 1. At this time, because start-up restriction is set on the second high-power system 2, the second high-power system 2 is not allowed to start up the actuator (Yes in step S93). On the other hand, the start-up coordinating system 3 receives a start-up request from the second high-power system 2 (Yes in step S71), and then waits until the actuator of the first high-power system 1 stops (Yes in step S73). Subsequently, as the actuator of the first high-power system 1 stops (No in step S73), the start-up coordinating system 3 sets start-up restriction on the first high-power system 1 (step S74; arrow H in the drawing). Then, the start-up coordinating system 3 waits until the waiting time WT elapses (step S75). Then, as the waiting time WT has elapsed, the start-up coordinating system 3 determines whether the first high-power system 1 is not in operation (step S76) and then sets no start-up restriction on the second high-power system 2 (step S77; arrow I in the drawing). When no start-up restriction is set on the second high-power system 2 (No in step S93), the second high-power system 2 initiates start-up of the actuator (step S94).

When the actuator of the second high-power system 2 stops (Yes in step S96), the start-up request from the second high-power system 2 is cancelled (step S97; arrow J in the drawing). Then, when the actuator of the second high-power system 2 stops (Yes in step S78), the start-up coordinating system 3 sets no start-up restriction on the first high-power system 1, and sets start-up restriction on the second high-power system 2 (step S79).

It is assumed that the first high-power system 1 and the second high-power system 2 request start-up at substantially the same timing (step S92). Then, because no start-up restriction is set on the first high-power system 1 (No in step S93), the first high-power system 1 initiates start-up of the actuator immediately (step S94; at X in the drawing). On the other hand, because start-up restriction is set on the second high-power system 2, the second high-power system 2 is not allowed to start up the actuator (Yes in step S93). At the time when the start-up coordinating system 3 receives a start-up request from the second high-power system 2 (Yes in step S71), the actuator of the first high-power system 1 is stopped (No in step S73). Thus, the start-up coordinating system 3 once sets start-up restriction on the first high-power system 1 (step S74; arrow K in the drawing).

After that, the start-up coordinating system 3 once sets start-up restriction on the first high-power system 1 and then waits until the waiting time WT elapses (step S75). Then, at the time when the waiting time WT has elapsed, the first high-power system 1 is in operation (Yes in step S76). Thus, the start-up coordinating system 3 sets no start-up restriction on the first high-power system 1 (step S80).

In this way, start-up restriction is once set on the first high-power system 1 and then no start-up restriction is set on the first high-power system 1 again. However, because start-up restriction is continuously set on the second high-power system 2, the second high-power system 2 is continuously not allowed to start up the actuator (Yes in step S93).

After that, the start-up coordinating system 3 receives a start-up request from the second high-power system 2 (Yes in step S71) and then waits until the actuator of the first high-power system 1 stops (Yes in step S73). Subsequently, as the actuator of the first high-power system 1 stops (No in step S73), the start-up coordinating system 3 sets start-up restriction on the first high-power system 1 (step S74; arrow L in the drawing). Then, the start-up coordinating system 3 waits until the waiting time WT elapses again (step S75). As the waiting time WT has elapsed, the start-up coordinating system 3 determines whether the first high-power system 1 is not in operation (step S76) and then sets no start-up restriction on the second high-power system 2 (step S77; arrow M in the drawing). When no start-up restriction is set on the second high-power system 2 (No in step S93), the second high-power system 2 initiates start-up of the actuator (step S94). When the actuator of the second high-power system 2 stops (Yes in step S96), the start-up request from the second high-power system 2 is cancelled (step S97; arrow N in the drawing). Then, when the actuator of the second high-power system 2 stops (Yes in step S78), the start-up coordinating system 3 sets no start-up restriction on the first high-power system 1, and sets start-up restriction on the second high-power system 2 (step S79).

In this way, when the second high-power system 2 having a relatively low priority is started up, the operation controller according to the embodiment outputs a signal for restricting start-up to the first high-power system 1 having a relatively high priority and then allows the second high-power system 2 to start up after a lapse of a period of time during which the start-up restriction on the first high-power system is carried out. Thus, it is possible to prevent a situation that a plurality of electrical loads start up overlappingly. For example, when start-up requests are issued from a plurality of systems at substantially the same timing, start-up of the system having a higher priority is preferentially carried out, thus making it possible to start up an actuator without overlapping operations. Specifically, if start-up of the second high-power system 2 is immediately allowed in response to a start-up request from the second high-power system 2 shown in the arrow K in FIG. 7, the actuator of the first high-power system 1 may possibly initiate start-up while start-up restriction notification is being provided to the first high-power system 1. This causes overlapping operations between the plurality of systems. However, after waiting until the waiting time WT elapses since a start-up request has been received from the second high-power system 2 as indicated by the arrow K in the drawing, it is determined whether the second high-power system 2 is allowed to start up. Thus, it is possible to prevent overlapping operations between the plurality of systems.

Note that in the above described operations, when the power supply capacity of the battery 10 is sufficient, no start-up restriction is set on both the first high-power system 1 and the second high-power system 2 to allow overlapping operations; instead, operation control may be executed irrespective of the state of the battery 10. For example, when it is determined in step S51 that the power supply capacity of the battery 10 is sufficient as well, the operation in step S52 is carried out, that is, no start-up restriction is set on the first high-power system 1, and start-up restriction is set on the second high-power system 2, and then start-up restriction state signals indicating those start-up restriction states are output respectively to the first high-power system 1 and the second high-power system 2. Thus, when the power supply capacity of the battery 10 is sufficient as well, it is possible to carry out similar coordination as start-up coordination carried out when the power supply capacity is low. In this case, means for determining the power supply capacity of the battery 10 (power source monitoring unit 4) is unnecessary, and, as a result, it is possible to carry out start-up coordination in a further simple procedure.

In addition, in the above description, the start-up coordinating system 3 coordinates operations between two high-power systems having different priorities. Instead, the start-up coordinating system 3 may coordinate operations among three or more high-power systems having different priorities. For example, among three or more high-power systems, a system having the highest priority is handled similarly as the above described first high-power system 1, and other systems are handled similarly as the above described second high-power system 2. Then, in each of the high-power systems that are not given the highest priority, in step S74, start-up restriction is set on a first system, from which a start-up request is issued, with respect to a second system having a priority higher than the first system, and it is determined in step S76 whether the second system having the higher priority is in operation. In this manner, a similar process is possible.

In addition, in the above description, the air injection system, the sequential manual transmission system, the brake assist system, and the like, are listed as examples of the first high-power system 1 and the second high-power system 2. Any one of these listed systems may be the first high-power system 1, and any one of these listed systems may be the second high-power system 2. Priorities may be assigned to the systems on the basis of importance of each system in the vehicle, and then the start-up coordinating system 3 may coordinate operations of the systems. In addition, the first high-power system 1 and the second high-power system 2 may be electrical loads different from the electrical loads that control the driving mechanism or the operating mechanism. The operation controller according to the aspects of the invention is able to control operations of various electrical loads as long as the electrical loads are mounted on the vehicle.

In addition, thresholds, and the like, for determining the above described operation sequence or power supply capacity are only illustrative; and, of course, the aspects of the invention may be implemented with other operation sequences or other thresholds. In addition, in the above description, it is assumed that electric power having a rated voltage of about 12 V is supplied. Of course, the aspects of the invention may be applied to an electric power supply system that supplies electric power having a rated voltage of about 24 V used in a large vehicle, or the like.

The embodiment of the invention is described in detail; however, the above described embodiment is only illustrative in every respect and is not intended to limit the scope of the invention. The above embodiment may be improved or modified into various forms without departing from the scope of the invention.

The operation controller according to the embodiment of the invention is able to stably supply electric power to a plurality of electrical loads mounted on a vehicle by optimally coordinating operations of the electrical loads. Thus, the operation controller is useful in vehicles, or the like, equipped with a plurality of electrical loads.

The invention claimed is:
1. An operation controller that controls operations of a plurality of electrical loads mounted on a vehicle and having assigned priorities, comprising:
 a start-up request accepting portion configured to accept a plurality of start-up requests from the electrical loads; and a start-up coordinating portion configured to control start-up of the electrical loads on the basis of the priorities so as to (1) start up both a first electrical load having a relatively high priority among the plurality of electrical loads and a second electrical load having a relatively low priority among the plurality of electrical loads when a power supply capacity is higher than a threshold, and (2) start up the first electrical load and output a second start-up restriction state signal for restricting start-up of the second electrical load when the power supply capacity is lower than or equal to the threshold, wherein when the start-up request accepting portion accepts a start-up request from the second electrical load in a state where the second electrical load has received the start-up restriction state signal, the start-up coordinating portion outputs a first start-up restriction state signal for restricting start-up of the first electrical load, and when the first electrical load is stopped after a predetermined waiting time elapses since the first start-up restriction state signal has been output, the start-up coordinating portion controls the second electrical load to start up.

2. The operation controller according to claim 1, wherein, when the start-up request accepting portion accepts the start-up request from the second electrical load and when the first electrical load is stopped at that time, the start-up coordinating portion outputs a signal for restricting start-up of the first electrical load.

3. The operation controller according to claim 1, wherein the waiting time at least includes a transmission time required to transmit a signal from the operation controller to the first electrical load.

4. The operation controller according to claim 3, wherein the waiting time further includes a reception time required to transmit a signal from the first electrical load to the operation controller.

5. The operation controller according to claim 3, wherein the waiting time further includes a processing time during which the first electrical load accepts a signal from the operation controller and then processes the signal.

6. The operation controller according to claim 1, wherein
when the start-up request accepting portion accepts the start-up request from the second electrical load, the start-up coordinating portion outputs a signal for restricting start-up of the first electrical load, and when the first electrical load is being started up or in operation after the waiting time elapses since the signal has been output, the start-up coordinating portion allows the first electrical load to start up again and continuously outputs a signal for restricting start-up of the second electrical load.

7. The operation controller according to claim 1, wherein, when the start-up request accepting portion accepts the start-up request from one electrical load at the time when another electrical load is in operation, the start-up coordinating portion controls the one electrical load, from which the start-up request is issued, to start up after the another electrical load stops.

8. The operation controller according to claim 1, wherein start-up of the second electrical load, for which the start-up request accepting portion accepts the start-up request, is restricted by the start-up coordinating portion in advance.

9. The operation controller according to claim 1, further comprising:
a power source determination portion configured to determine whether the power supply capacity of a battery mounted on the vehicle is sufficient.

10. The operation controller according to claim 9, wherein when the start-up coordinating portion outputs a signal for restricting start-up of the second electrical load, the start-up request accepting portion accepts the start-up request from the second electrical load.

11. The operation controller according to claim 9, wherein the power source determination portion determines, on the basis of any one of a voltage value of the battery or both a voltage value of the battery and an output electric current value of the battery, whether the power supply capacity of the battery is sufficient.

12. The operation controller according to claim 9, wherein
the power source determination portion determines, on the basis of a temperature of the battery, whether the power supply capacity of the battery is sufficient, and when the temperature is lower than or equal to a predetermined temperature, the power source determination portion determines that the power supply capacity of the battery is insufficient.

13. The operation controller according to claim 1, wherein, when one electrical load is in operation and when the start-up coordinating portion outputs a signal for restricting start-up of the one electrical load, the one electrical load in operation continues to be in operation.

14. A method of controlling operations of a plurality of electrical loads mounted on a vehicle and having assigned priorities, comprising:
using a startup coordinating system for accepting a start-up request from the electrical loads;

using the startup coordinating system for controlling start-up of the electrical loads on the basis of the priorities so as to (1) start up both a first electrical load having a relatively high priority among the plurality of electrical loads and a second electrical load having a relatively low priority among the plurality of electrical loads when a power supply capacity is higher than a threshold, and (2) start up the first electrical load and output a second start-up restriction state signal for restricting start-up of the second electrical load when the power supply capacity is lower than or equal to the threshold;

when the start-up request is output from a second electrical load which has received the start-up restriction state signal, outputting a first start-up restriction state signal for restricting start-up of a first electrical load; and when the first electrical load is stopped after a predetermined waiting time elapses since the first start-up restriction state signal has been output, controlling the second electrical load to start up.

15. The method according to claim 14, further comprising:
determining whether the power supply capacity of a battery mounted on the vehicle is sufficient;

when it is determined that the power supply capacity of the battery is sufficient, allowing the first electrical load and the second electrical load to start up; and when it is determined that the power supply capacity of the battery is insufficient, allowing the first electrical load to start up and restricting start-up of the second electrical load.

* * * * *